United States Patent
Hunt et al.

(10) Patent No.: US 9,965,517 B2
(45) Date of Patent: May 8, 2018

(54) WINDOWLESS REAL-TIME JOINS

(71) Applicant: 60East Technologies, Inc., Las Vegas, NV (US)

(72) Inventors: Brand Hunt, Las Vegas, NV (US); Patrick Flickinger, Redmond, WA (US)

(73) Assignee: 60EAST TECHNOLOGIES, INC., Las Vegas, NV (US)

( * ) Notice: Subject to any disclaimer, the term of this patent is extended or adjusted under 35 U.S.C. 154(b) by 287 days.

(21) Appl. No.: 14/667,508

(22) Filed: Mar. 24, 2015

(65) Prior Publication Data
US 2015/0269227 A1  Sep. 24, 2015

Related U.S. Application Data

(60) Provisional application No. 61/969,739, filed on Mar. 24, 2014.

(51) Int. Cl.
*G06F 17/30* (2006.01)

(52) U.S. Cl.
CPC .. *G06F 17/30498* (2013.01); *G06F 17/30516* (2013.01)

(58) Field of Classification Search
CPC .............. G06F 17/30516; G06F 17/30498
See application file for complete search history.

(56) References Cited

U.S. PATENT DOCUMENTS

| | | | |
|---|---|---|---|
| 2006/0085592 A1* | 4/2006 | Ganguly | G06F 17/30498 711/114 |
| 2006/0143170 A1* | 6/2006 | Ganguly | G06F 17/30516 |
| 2016/0283554 A1* | 9/2016 | Ray | G06F 17/30516 |

OTHER PUBLICATIONS

Patrick Flickinger, Real-time Streaming JOINS, Reinvented!, Apr. 7, 2014, www.crankuptheamps.com, pp. 1-10.*

* cited by examiner

*Primary Examiner* — Leslie Wong
(74) *Attorney, Agent, or Firm* — Bryan Cave LLP

(57) ABSTRACT

A method for performing windowless real-time joins. The method can be implemented via execution of computer instructions configured to run at one or more processing modules and configured to be stored at one or more non-transitory memory storage modules. The method can include, prior to receiving data, initializing data structures. The method also can include, prior to receiving data, pre-computing steps to be performed upon receiving the data. The method additionally can include, upon receiving the data, performing windowless join updates. Other embodiments are provided.

22 Claims, 6 Drawing Sheets

WINDOWLESS REAL-TIME JOINS

CROSS-REFERENCE TO RELATED APPLICATIONS

This application claims the benefit of U.S. Provisional Application No. 61/969,739, filed Mar. 24, 2014. U.S. Provisional Application No. 61/969,739 is incorporated herein by reference in its entirety.

TECHNICAL FIELD

This disclosure relates generally to performing operations on streams of data, and relates more particularly to performing join operations without delaying for a window of time.

BACKGROUND

In performing operations on streams of data, conventional Complex Event Processing (CEP) systems generally perform processing during a window of time, such as a batch window, a sliding window, a hopping window, an accrual window, or some variation or combination thereof. In such operations, the entirety of the window's specified time generally must elapse before a calculation can occur. A join operation can be used to perform the association of objects in one data stream with objects that share one or more common attributes in another data stream. In conventional CEP systems, the join operation is generally delayed by the elapsed time of the window, even though the operation is sometimes described as occurring in "real time."

BRIEF DESCRIPTION OF THE DRAWINGS

To facilitate further description of the embodiments, the following drawings are provided in which.

Figure 1:
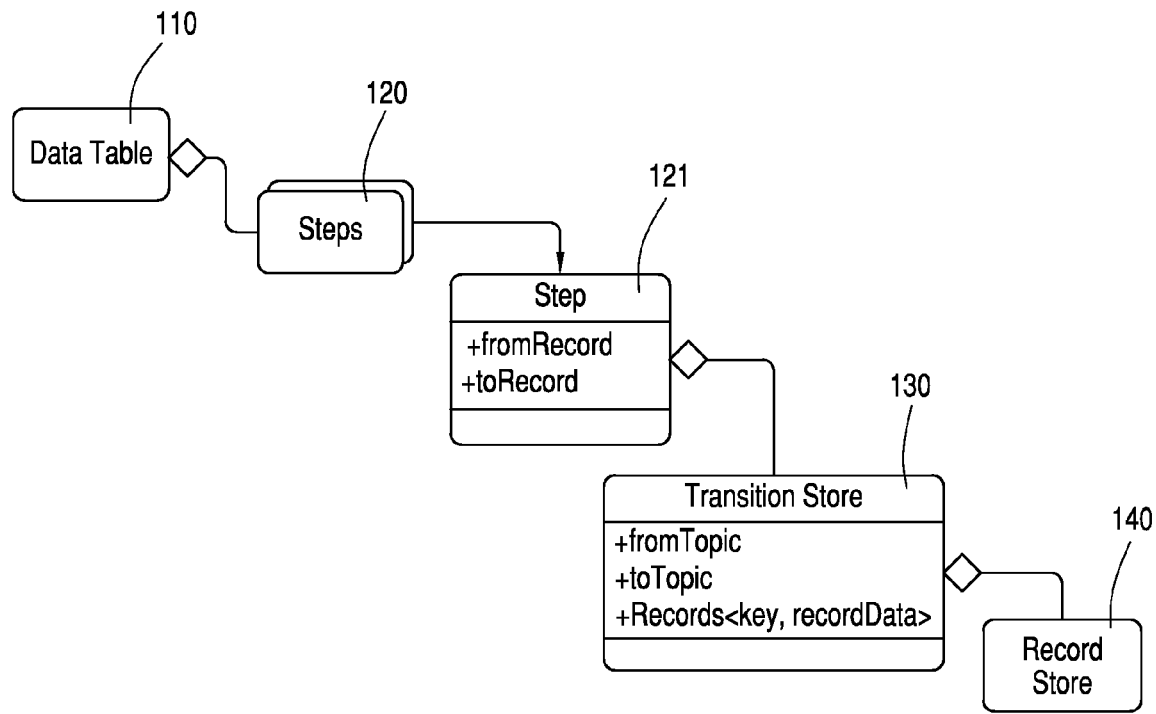
FIG. 1 illustrates a structure diagram showing an exemplary data model that can be used for performing windowless real-time joins, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments include a method for performing windowless real-time joins. The method can be implemented via execution of computer instructions configured to run at one or more processing modules and configured to be stored at one or more non-transitory memory storage modules. The method can include, prior to receiving data, initializing data structures. The method also can include, prior to receiving data, pre-computing steps to be performed upon receiving the data. The method additionally can include, upon receiving the data, performing windowless join updates.

A number of embodiments include a system configured to perform windowless real-time joins. The system can include one or more processing modules, and one or more non-transitory memory storage modules storing computing instructions configured to run on the one or more processing modules and perform certain acts. The acts can include, prior to receiving data, initializing data structures. The acts also can include, prior to receiving data, pre-computing steps to be performed upon receiving the data, The acts additionally can include, upon receiving the data, performing windowless join updates.

In conventional CEP systems, the join operation is generally delayed by the elapsed time of a window, such as a batch window, a sliding window, a hopping window, an accrual window, or some variation or combination thereof, even though the operation is sometimes described as occurring in "real time." By contrast, various embodiments of the systems and methods described herein can perform join operations without delaying for a window of time or waiting for some interval. In many embodiments of the systems and methods described herein, the join operations can be performed in real-time on data records as they arrive, rather than computed in a delayed manner after the join is requested.

The systems and methods described herein can have uses in a wide variety of areas and fields that produce and/or track data. In many embodiments, the systems and methods can be used in and/or with publisher—subscriber systems. For example, in some embodiments the system and methods described herein can be used to perform windowless real-time join operations on streams of financial transaction data. In another example, the systems and methods described herein can be used to perform windowless real-time join operations on streaming data of customer orders. The systems and method described herein can perform a windowless join operation on the customer order data stream with a customer data stream, for example, which can provide contextual insight regarding the customers associated with the customer orders in real time without a delay window.

Turning to the drawings, FIG. 1 illustrates a structure diagram showing an exemplary data model that can be used for performing windowless real-time joins, according to an embodiment. It should be understood that the data model presented in FIG. 1 is merely exemplary, and other suitable data models can be used in other embodiments. The systems and method described herein can be employed in many different embodiments or examples not specifically described herein.

In a number of embodiments, the data model of FIG. 1 can include data tables 110. In many embodiments, each of data tables 110 can be a table of data, such as a table in a relational database.

In some embodiments, the data model of FIG. 1 can include steps 120, such as a step 121. In various embodiments, each of steps 120 can be pre-computed, rather than computed when a join operation is requested. In many embodiments, each of steps 120, such as step 121, can include a fromRecord and a toRecord, and can represent the step needed to traverse from a record (fromRecord) in one of data tables 110 to another record (toRecord) in another one of data tables 110. Given a tuple, the step can return a set of data records. In order to handle an update of any one of data tables 110, step 121 can store information regarding how an update to one of data tables 110 can affect the relationship with another one or data tables 110. Such relationships can be affected when the update to one of data tables 110 involves a join key. A join step can include the operations needed to connect one of data tables 110 to another one of data tables 110. Specifically, the join step can include the location information of join keys of a first one of data tables 110 (a "from data table") and a second one of data tables 110 (a "to data table"). The join step also can include an instance of a transition store used in the join, such as one of transition stores 130, as described below. The join step also can include operations to retrieve the record rows associated with the join keys.

In various embodiments, the data model of FIG. 1 can include transition stores 130. Transition stores 130 can provide in-memory representations of the join key lookup operations that connect two data tables. In a number of embodiments, each of transition stores 130 can include a record store (such as record store 140, described below) associated with the transitional stage between a record of a first data table and another record of a second data table. In various embodiments, these records can be stored as tuples. In several embodiments, transitions stores 130 can be used during updates of data records to determine to which group a record belongs, such as by traversing the transition to parent tables and/or child tables.

In a number of embodiments, the data model of FIG. 1 can include record stores, such as record store 140. In several embodiments, the record stores (e.g., 140) can provide a data store for each one of data tables 110. In many embodiments, record stores can be referenced by a hash key of the data table and can include indexed records for the data table.

In some embodiments, the data model of FIG. 1 can include record comparators. A record comparator can be provided for each one of data tables 110. In many embodiments, the record comparators can be used to compare column values in the data table. The record comparators can be initialized with the data table and column names, which can be used to retrieve the value.

Figure 2:
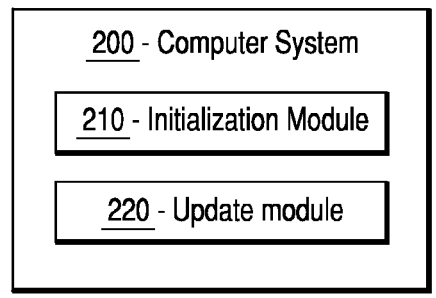
FIG. 2 illustrates a block diagram of an exemplary computer system, according to an embodiment.

Turning ahead in the drawings, FIG. 2 illustrates a block diagram of computer system 200, according to an embodiment. Computer system 200 can be employed in many different embodiments or examples not specifically depicted or described herein. In some embodiments, certain elements or modules of computer system 200 can perform various procedures, processes, and/or acts. In other embodiments, the procedures, processes, and/or acts can be performed by other suitable elements or modules.

Referring to FIG. 2, in a number of embodiments, computer system 200 can include an initialization module 210. In many embodiments, initialization module 210 can perform one or more procedures, processes, and/or acts at the time of initialization and prior to receiving data. For example, initialization module 210 can create join steps and pre-compute the steps to perform upon receipt of data. In several embodiments, computer system 200 can include an update module 220. In many embodiments, update module 220 can perform windowless join operations upon receiving data.

Figure 3:
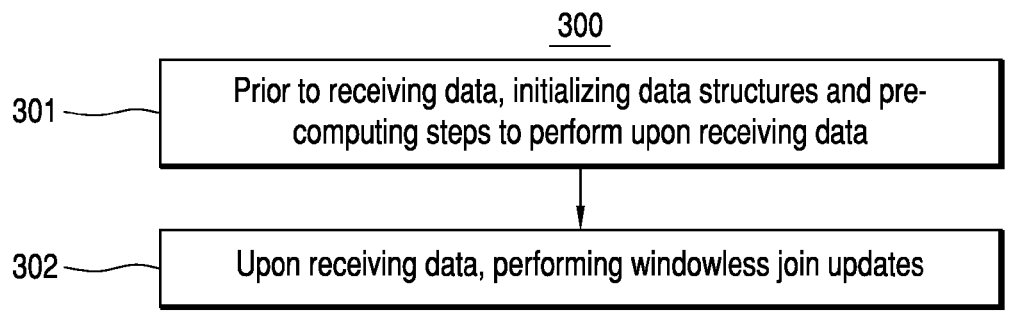
FIG. 3 illustrates a flow chart for an exemplary method of performing windowless real-time joins, according to an embodiment.

Turning ahead in the drawings, FIG. 3 illustrates a flow chart for a method 300 of performing windowless real-time joins, according to an embodiment. Method 300 is merely exemplary and is not limited to the embodiments presented herein. Method 300 can be employed in many different embodiments or examples not specifically depicted or described herein. In some embodiments, the procedures, the processes, and/or the activities of method 300 can be performed in the order presented. In other embodiments, the procedures, the processes, and/or the activities of method 300 can be performed in any suitable order. In still other embodiments, one or more of the procedures, the processes, and/or the activities of method 300 can be combined or skipped. In some embodiments, method 300 can be implemented via execution of computer instructions configured to run at one or more processing modules and configured to be stored at one or more non-transitory memory storage modules. For example, method 300 can be implemented by computer system 200 (FIG. 2).

Referring to FIG. 3, in some embodiments, method 300 can include a block 301 of, prior to receiving data, initializing data structures and pre-computing steps to perform upon receiving data. In many embodiments, the data structures can be identical or similar to the structures described in the data model of FIG. 1. In some embodiments, the data structures in the data model can be constructed during initialization. In various embodiments, block 301 can be performed by initialization module 210 (FIG. 2). In many embodiments, initialization module 210 (FIG. 2) and/or block 301 can pre-compute join steps at system startup that can be executed at runtime, which can advantageously reduce execution latency upon receiving data.

In several embodiments, method 300 also can include a block 302 of, upon receiving data, performing windowless join updates. The data structures initialized in block 301 can be used during block 302 to traverse the records associated with the join operations and store the records. In a number of embodiments, block 302 can be performed by update module 220 (FIG. 2).

Figure 4:
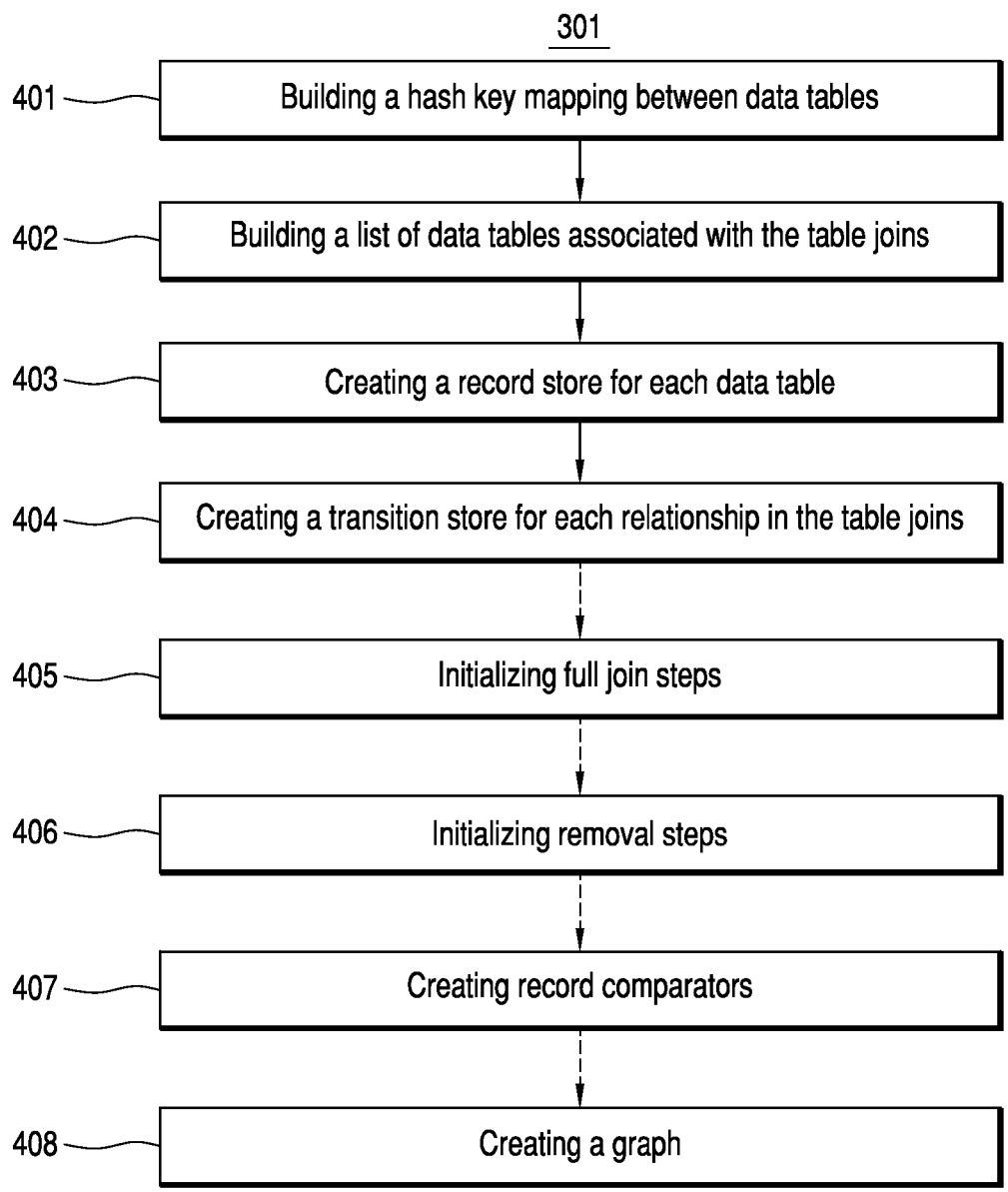
FIG. 4 illustrates a flow chart for a process of, prior to receiving data, initializing data structures and pre-computing steps to perform upon receiving data, according to the embodiment of FIG. 3.

Turning ahead in the drawings, FIG. 4 illustrates a flow chart for a process of block 301 of, prior to receiving data, initializing data structures and pre-computing steps to perform upon receiving data, according to an embodiment. Block 301 is merely exemplary and is not limited to the embodiments presented herein. Block 301 can be employed in many different embodiments or examples not specifically depicted or described herein. In some embodiments, the procedures, the processes, and/or the activities of block 301 can be performed in the order presented. In other embodiments, the procedures, the processes, and/or the activities of block 301 can be performed in any suitable order. In still other embodiments, one or more of the procedures, the processes, and/or the activities of block 301 can be combined or skipped.

Referring to FIG. 4, in some embodiments block 301 can include a block 401 of building a hash key mapping between data tables. In a number of embodiments, block 401 can include creating a map of the hash keys for each of data tables 100 (FIG. 1), which can represent the relationship between each data table in the join. In many embodiments, block 401 can include receiving a join plan from a user, which can be represented as table joins. For example, the table joins can be:

JOIN: a.a2b=b.b2a and b.b2c=c.c2b and a.a2d=d.d2a,
where a.a2b=b.b2a represents column a2b of data table A joining column b2a of data table B. With the relationship of A to B, block 401 can create a mapping of the hash key of data table A to the hash key of data table B, with their associated keys. For example, FIG. 6, described below, illustrates a data table diagram showing the relationship between data tables A, B, C, and D based on the table joins example described above.

In some embodiments, block 301 also can include a block 402 of building a list of data tables associated with the table joins. In many embodiments, block 402 can include creating a list of hash keys of the data tables in the order in which they are represented in the table joins. In the table joins example described above, the list of data tables can be A, B, C, D. In several embodiments, the list created in block 402 can be used in subsequent initialization operations.

In a number of embodiments, block 301 additionally can include a block 403 of creating a record store for each data table. In many embodiments, block 403 can include creating an empty record store, which can be similar or identical to record stores 140 (FIG. 1), for each of the data tables in the table joins. The record store can be used to add records upon receiving data.

In several embodiments, block 301 further can include a block 404 of creating a transition store for each relationship in the table joins. In a number of embodiments, the transition store can be similar or identical to transition store 130 (FIG. 1). In many embodiments, block 404 can include, for each data table, creating a mapping of the join key sets of the data table to the newly created transition store. In several embodiments, the transition store can include all mapping and traversal data required to perform windowless joins upon receiving data.

In various embodiments, block 301 optionally can include a block 405 of initializing full join steps. In many embodiments, block 405 can create join steps that can be followed for each data table when a record is received. In several embodiments, these join steps can be used for data changes, such as inserts, updates, and/or deletes. In a number of embodiments, the join steps can be identical or similar to steps 120 (FIG. 1). In several embodiments, each join step can include the transition store, the fromRecord, and the toRecord. In many embodiments, given n data tables, block 405 can create n−1 full join steps.

In some embodiments, block 301 further can include a block 406 of initializing removal steps. In many embodiments, block 406 can create removal join steps by taking a copy of the full steps and removing any steps that are children of the updating data table. For example, children can be back-edges in the join graph (as described below), and everything at that level or lower can be removed. In many embodiments, the removal join steps can be a subset of the full join steps. In various embodiments, the removal steps can be used when an upstream transition (as described below) is removed, resulting in the removal the last key. In such cases, null records linked to the current record, if any, would need to be added. In many embodiments, the removal steps can be used when an upstream transition is added for the first time, as any existing null records that are linked to the record would need to be removed.

In many embodiments, block 301 additionally can include a block 407 of creating record comparators. As described above, the record comparators can be used to compare the column values of data tables to determine whether a join condition is satisfied for the existing data values. In some embodiments, block 407 can create these record comparators for each data table and initialize the list of columns in the transition store of that data table.

In several embodiments, block 301 further can include a block 408 of creating a graph representing the relationship of the data tables. In many embodiments, the graph created in block 408 can be a conventional graph data structure in which forward edges represent traversal to children of a data table ("downstream") and back edges represent traversal to parents of a data table ("upstream"). The graph can beneficially allow update module 220 (FIG. 2) to efficiently determine ancestry during data updates involving record removal.

In various embodiments, block 301 of, prior to receiving data, initializing data structures and pre-computing steps to perform upon receiving data, can be implemented as described in the pseudo code listed in Table 1. The pseudo code in Table 1 is merely exemplary, and block 301 can be implemented through other suitable implementations.

TABLE 1

```
INIT(tableJoins):
    create list of data tables;
    loop through tableJoins:
        createHashMap(tableJoins.from, tableJoins.to, tableJoins.keys);
    create graph(tables[0], join_key_mapping)
    loop through tables:
        create a hashmap of transitionStores for the table;
        loop through the table's children:
            add a transtion store (fromTable, toTable);
    loop through tables:
        create a step for the dataTable through CalculateJoinSteps( );
    removalSteps = steps;
    loop through the steps:
        if the step is a child of the dataTable:
            remove the step;
CalculateJoinSteps:
    For each adjacent data table from dataTable
        If not visited yet
            Add a new step(fromDataTable, toDataTable,
                transitionStore);
```

Figure 5:
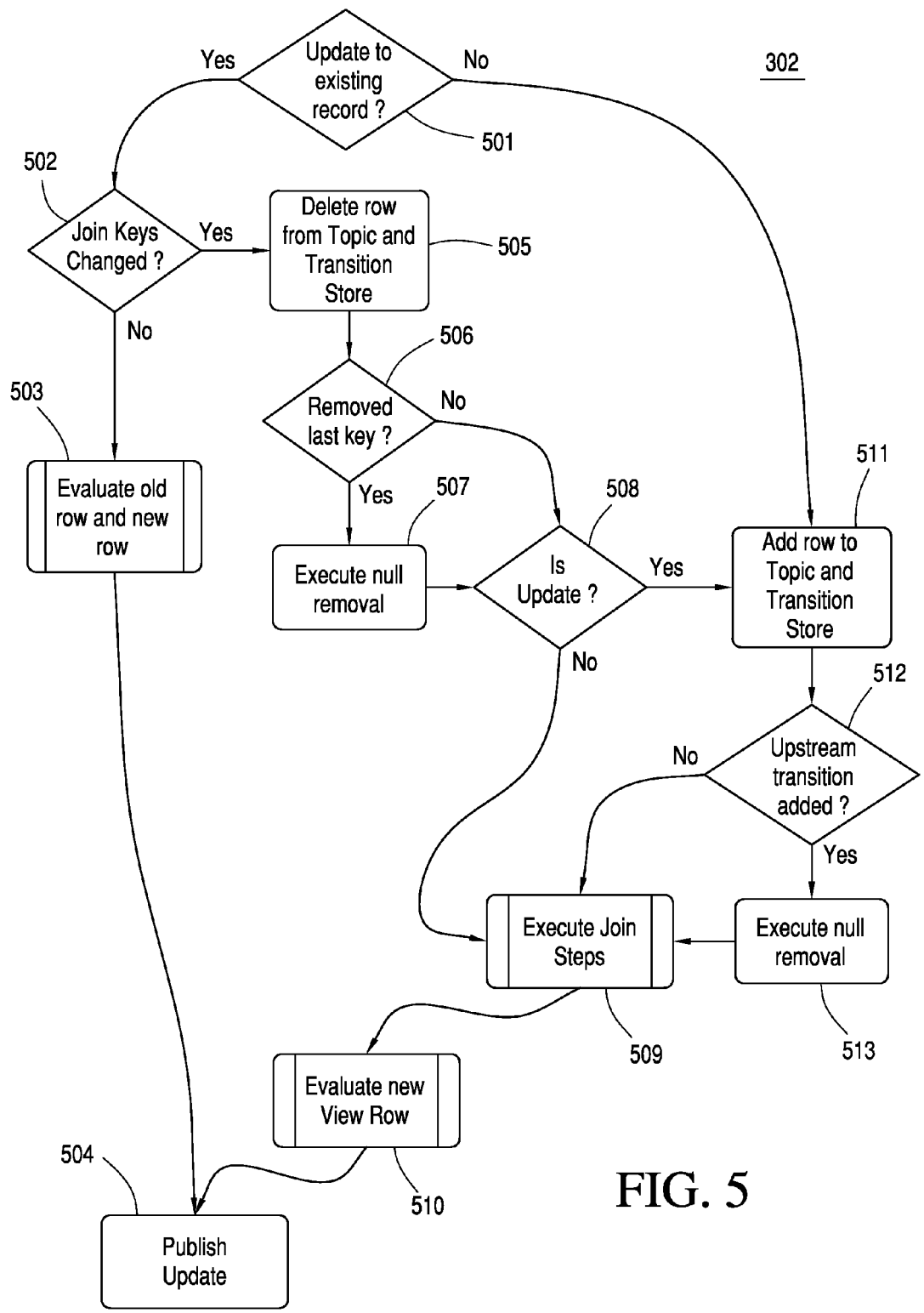
FIG. 5 illustrates a flow chart for a process of, upon receiving data, performing windowless join updates, according to the embodiment of FIG. 3.

Turning ahead in the drawings, FIG. 5 illustrates a flow chart for a process of block 302 of, upon receiving data, performing windowless join updates, according to an embodiment. The process of block 302 depicted in FIG. 5 is merely exemplary and is not limited to the embodiments presented herein. Block 302 can be employed in many different embodiments or examples not specifically depicted or described herein. In some embodiments, the procedures, the processes, and/or the activities of block 302 can be performed in the order presented. In other embodiments, the procedures, the processes, and/or the activities of block 302 can be performed in any suitable order. In still other embodiments, one or more of the procedures, the processes, and/or the activities of block 302 can be combined or skipped.

Referring to FIG. 5, in some embodiments, the process of block 302 can begin at a block 501, which can involve determining whether the data received is an update to an existing record, such as a record modification or a deletion. If the data received is an update to an existing record, the process of block 302 can proceed to a block 502. Otherwise, if the data received is a new record, the process of block 302 can proceed to a block 511.

At block 502, in some embodiments, the process of block 302 can include determining whether any join keys are changed by the update to the record. If any join keys are changed by the update to the record, the process of block 302 can proceed to a block 505, and the process of block 302 can involve series of blocks for removal, addition, and execution of join steps. Otherwise, if the join keys are unchanged, the removal, addition, and execution of join steps can be skipped, and the process of block 302 can proceed to block 503. By skipping the removal, addition, and execution of join steps when the keys are unmodified by the received data, the process of block 302 can advantageously increase the speed at which updates to joined records are processed.

At a block 503, in a number of embodiments, the process of block 302 can include evaluating the old row and a new row. In many embodiments, the evaluation can involve adding a row to a group or removing a row from a group. In several embodiments, a group can be the logical grouping of data specified in a view definition's grouping context, which can be aggregated by operations specified in view projection fields. In a number of embodiments, a group can include the data to be viewed as a result of the join operations. In many embodiments, in block 503, the old row represented in the old record in the group can be removed and replaced by the new row of data received because the join keys have not been changed. In some embodiments, the record store (e.g., record store 140 (FIG. 1)) of the data table (e.g., one of data tables 110 (FIG. 1)) can be updated with the new record.

After block 503, in many embodiments, the process of block 302 can proceed to a block 504 of publishing the updated group, and optionally displaying it to a user.

Back at block 505, in several embodiments, if the join keys have changed, the process of block 302 can include removing the row from the record store of the data table and from all transition stores. In various embodiments, the row can be removed from the record store and the transition stores because it can be no longer valid, based on the change to the join keys.

After block 505, in a number of embodiments, the process of block 302 can proceed to a block 506 of determining if the last key was removed. If the last key was removed, the process of block 302 can proceed to a block 507. Otherwise, if the last key was not removed, the process of block 302 can proceed to a block 508.

At block 507, in many embodiments, the process of block 302 can include executing a null removal, based on the last key having been removed. The null removal can be executed for each removal step initialized in block 406 (FIG. 4). After block 507, the process of block 302 can proceed to block 508.

At block 508, in several embodiments, the process of block 302 can include determining if the update is a modification or a deletion of an existing record. In many embodiments, if the update is a deletion, the process of block 302 can proceed to a block 509. Otherwise, if the update is a modification, the process of block 302 can proceed to block 511.

At block 511, in several embodiments, if the update is a modification, or the update is a new record, the process of block 302 can include adding the row to the record store (e.g., 140 (FIG. 1)) for the data table (e.g., one of data tables 110 (FIG. 1)) and the transition store (e.g., 130) for each data table (e.g., one of data tables 110 (FIG. 1)).

After block 511, in various embodiments, the process of block 302 can proceed to a block 512 of determining whether an upstream transition was previously added. In many embodiments, if an upstream transition was previously added, the process of block 302 can proceed to a block 513. Otherwise, if an upstream transaction was not previously added, the process of block 302 can proceed to block 509.

At block 513, in a number of embodiments, the process of block 302 can include executing a null removal to handle the previously added upstream transition. In several embodiments, block 513 can be identical or similar to block 507 of executing a null removal. In many embodiments, the null removal can be executed for each removal step initialized in block 406 (FIG. 4). After block 513, in various embodiments, the process of block 302 can proceed to block 509.

At block 509, in some embodiments, the process of block 302 can include executing join steps. In many embodiments, executing join steps in block 509 can involve executing the join steps initialized in block 405 (FIG. 4) of initializing full join steps. In several embodiments, the steps can be executed for each data table in the table joins. In various embodiments, block 509 can include retrieving joined rows of data from related data tables when the data values in the specified join key fields are equal. In several embodiments, determining whether the data values in the specific join key fields are equal can be performed by using the record comparators.

After block 509, in a number of embodiments, the process of block 302 can proceed to a block 510 of evaluating the new row. In many embodiments, evaluation of the new row can involve adding the new row of data received to the group. After block 509, in several embodiments, the process of block 302 can finish at block 504 of publishing the updated group, and optionally displaying it to a user.

In a number of embodiments, dirty groups can be used to obscure the data changes that occur in performing the removal and join steps in the process of block 302 when processing an update on data received. Dirty groups can be a list of all rows changed by processing an update due to receiving a data record. For example, adding a new record can result in one or more removal steps and one or more join steps, which can result in changes to the appearance of the data values in the group. In some embodiments, join tuples can be conflated based on some of the data contained within the joined tuple. Conflating join tuples can beneficially reduce downstream processing burden. Using dirty groups can advantageously prevent the user from seeing the interim data changes and/or can beneficially prevent publishing extra data that could otherwise result in saturation of data received by those subscribed to the published data, such as various aggregation systems. In some embodiments, block 504 of publishing the updated group can include publishing all the dirty groups by iterating through each dirty group to publish the updates.

In certain embodiments, block 302 of, upon receiving data, performing windowless join updates, can be implemented as described in the pseudo code listed in Table 2. The pseudo code in Table 2 is merely exemplary, and block 302 can be implemented through other suitable implementations.

TABLE 2

```
UPDATE:
Reset the dirty groups;
if isUpdate and join keys are unchanged:
    dosteps(RemoveOldAction, dataTable->steps, 0)
    dosteps(AddNewAction, dataTable->steps, 0)
    update the dataTable's record store with the new record;
else:
    if oldRecord changed:
        dosteps(RemoveOldAction, dataTable->steps, 0)
        remove the oldRecord from the dataTable's record store;
        remove the oldRecord from all transitionStores;
        if an upstream transition was removed and it was the last key:
            dosteps(AddNullAction, dataTable->nullRemovalSteps, 0)
    if newRecord changed:
        add the newRecord to the dataTable's record store;
        add the newRecord to all transitionStores;
        if an upstream transition was added:
            dosteps(AddNullAction, dataTable->nullRemovalSteps, 0)
        dosteps(AddNewAction, dataTable->steps, 0)
publish all dirty groups;
RemoveOldAction( )
    find the group that contains the oldRecord;
    reevaluate the group without the previous record;
    add the old group to dirtyGroups;
AddNullAction( )
    find a group for the newRecord or create a new one;
    reevaluate the group with the nullRecord;
    add the new group to dirtyGroups;
AddNewAction( )
    find the group that contains the newRecord;
    reevaluate the group with the new record;
    add the new group to dirtyGroups;
```

TABLE 2-continued

```
dosteps(doAction, steps, step)
    records = step.getRecords(recordTuple);
    if step is last step
        if (records.size > 0):
            for each record in records:
                recordTuple[step.toIndex] = step.getRow(record)
                doAction( )
        else:
            if (recordTuple[0]):
                # this condition gives left inner joins
                # remove to call every time for full outer joins
                recordTuple[step.toIndex] = null_record
                doAction( )
    else:
        if (records.size > 0):
            for each record in records:
                recordTuple[step.toIndex] = step.getRow(record)
                dosteps(steps, stepn+1)
        else:
            dosteps(steps, stepn+1)
```

As shown in the pseudo code in Table 2, block 302 of, upon receiving data, performing windowless join updates, can be implemented to perform left inner joins or full outer joins. The implementation provided in Table 2 can facilitate simple alteration between performing left inner joins and performing full outer joins by adding or removing a simple condition, as commented in the dosteps routine. The process can thus beneficially allow alteration of the dosteps predicate to select join type.

In various embodiments, execution of removal or join steps in block 302 can be skipped on recovery, when starting with existing data. In many embodiments, although the record stores (e.g., 140 (FIG. 1)) can be updated, the execution steps are not executed on recovery. In a number of embodiments, block 302 can reconstruct the joined state. In several embodiments, the joined state can be organized by data table (e.g., 110) to reduce a number of valid joined tuples determined by join type, such as full outer join, inner join, left outer join, etc. Skipping the execution steps can advantageously reduce the wait time from when computer system 200 (FIG. 2) starts until it can process new updates, such as in block 302 (FIG. 5).

Figure 6:
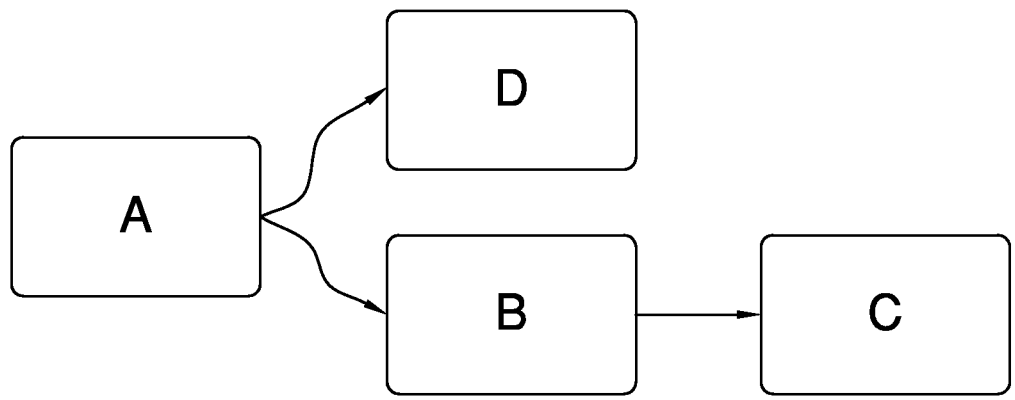
FIG. 6 illustrates a data table diagram showing the relationship between exemplary data tables, based on exemplary table joins, according to an embodiment.

Turning ahead in the drawings, FIG. 6 illustrates a data table diagram showing the relationship between exemplary data tables A, B, C, and D, which can be similar or identical to data tables 110 (FIG. 1), based on exemplary table joins. As described above, as an example, the table joins can be:
JOIN: a.a2b=b.b2a and b.b2c=c.c2b and a.a2d=d.d2a, where a.a2b=b.b2a represents column a2b of data table A joining column b2a of data table B. FIG. 6 shows the relationship between data tables A, B, C, and D based on the given exemplary table joins example.

Figure 7:
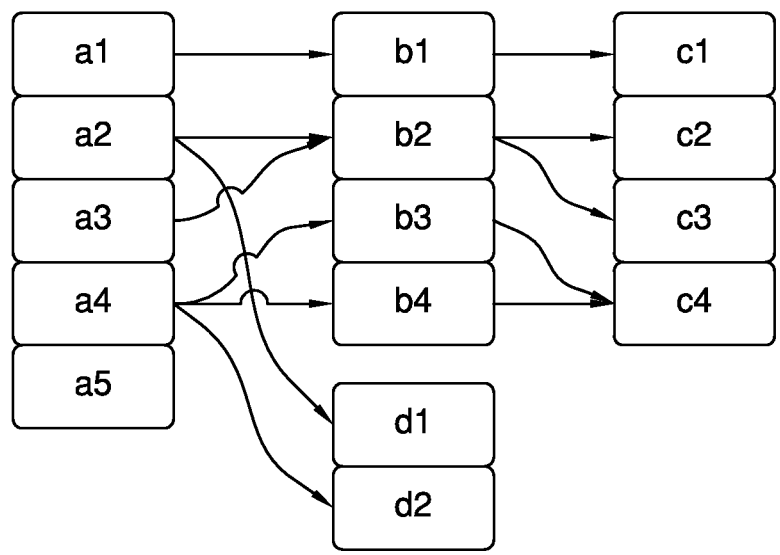
FIG. 7 illustrates a node diagram for exemplary sets of data records, according to the data table diagram of FIG. 6.

Turning ahead in the drawings, FIG. 7 illustrates a node diagram for exemplary sets of data records, according to the data table diagram of FIG. 6. As depicted in FIG. 7, data table A includes 5 records, a1, a2, a3, a4, and a5; data table B includes 4 records, b1, b2, b3, and b4; data table C includes 4 records, c1, c2, c3, and c4; and data table D includes 2 records, d1 and d2. Each record can represent a row of data. Each line connecting a data record to another data record in another table can represent matching values of join keys for the data records. For example, the line connecting a1 to b1 can represent that the value of the join key for a1 matches the value of the join key for b1. In many embodiments, the lines can show how the joins are constructed through record linkage.

In several embodiments, each set of connected records in FIG. 7 can be represented in a tuple in which each of the listed elements of the tuple can be for a distinct data table in the list of data tables, for example, as determined in block 402 (FIG. 4). For example, the tuple <a4,b3,c4,d2> can represent that records a4, b3, c4, and d2 are all grouped together based on the join tables (e.g., as shown in FIG. 6) and the matching values of the join keys in those records (e.g., as shown in FIG. 7). FIG. 7 can represent the real-time state of the join based on the values of the join keys in the data records, and can be highly mutable.

In a number of embodiments, each data record in FIG. 7 (e.g., a1, a2, a3, a4, a5, b1, b2, b3, b4, c1, c2, c3, c4, d1, d2), can be added through block 302 (FIG. 5) of, upon receiving data, performing windowless join updates. An exemplary operation of block 302 (FIG. 5) is illustrated in Table 3, showing the removal and join steps executed upon receiving each data record (e.g., a1, a2, a3, a4, a5, b1, b2, b3, b4, c1, c2, c3, c4, d1, d2) in the order listed in Table 3.

For example, when data record a1 is received as a new parent record in a new group, block 501 (FIG. 5) can determine that the data received is a new record, and the process of block 302 (FIGS. 3, 5) can proceed to block 511 (FIG. 5) of adding the data record as a row to the record store and create a transition store. In many embodiments, the process of block 302 (FIGS. 3, 5) can proceed to block 512 (FIG. 5) of determining that an upstream transition was not added. In several embodiments, the process of block 302 (FIGS. 3, 5) can then proceed to block 509 (FIG. 5) of executing the join steps, which can include finding the index of the data table (which is the position in the join), and setting that tuple location to the new data. In a number of embodiments, block 509 (FIG. 5) can get the first step that is required to join data table A to its children and extract that record from that location in the tuple. Because there is no data in that location, the record can be set to a null record. In various embodiments, block 509 (FIG. 5) can continue traversing the forward edges until the join steps are all exhausted. In block 510 (FIG. 5), in many embodiments, a new group to which the tuple belongs can be created, the tuple can be evaluated in that group, and the group can be added to the dirty groups. Proceeding to block 504 (FIG. 5), in several embodiments, the group in the dirty groups can be published. Receiving records a2, a3, a4, and a5 can proceed similarly through block 302 (FIG. 5).

TABLE 3

| | |
|---|---|
| a1 | +<a1, 0, 0, 0> |
| a2 | +<a2, 0, 0, 0> |
| a3 | +<a3, 0, 0, 0> |
| a4 | +<a4, 0, 0, 0> |
| a5 | +<a5, 0, 0, 0> |
| c1 | |
| c2 | |
| c3 | |
| c4 | |
| b1 | −<a1, 0, 0, 0> + <a1, b1, c1, 0> |
| b2 | −<a2, 0, 0, 0> − <a3, 0, 0, 0> + <a2, b2, c2, 0> + <a2, b2, c3, 0> + <a3, b2, c2, 0> + <a3, b2, c3, 0> |
| b3 | −<a4, 0, 0, 0> + <a4, b3, c4, 0> |
| b4 | +<a4, b4, c4, 0> |
| d1 | −<a2, b2, c2, 0> − <a2, b2, c3, 0> + <a2, b2, c2, d1> + <a2, b2, c3, d1> |
| d2 | −<a4, b3, c4, 0> − <a4, b4, c4, 0> + <a4, b3, c4, d2> + <a4, b4, c4, d2> |

As another example, upon receiving record b1, which is a child record that relates to an existing parent record, the block 501 (FIG. 5) can determine that the data received is a new record, and the process of block 302 (FIGS. 3, 5) can proceed to block 511 (FIG. 5) of adding the data record as a row to the record store and create a transition store. In several embodiments, the process of block 302 (FIGS. 3, 5) can proceed to block 512 (FIG. 5) of determining that an upstream transition was previously added, which therefore can proceed to null removal in block 513 (FIG. 5) of the previously added a1 record. In many embodiments, the process of block 302 (FIGS. 3, 5) can then proceed to block 509 (FIG. 5) of executing the join steps, which can include finding the index of the data table (which is the position in the join), and setting that tuple location to the new data. In several embodiments, block 509 (FIG. 5) can get the first step that is required to join data table B to its parents and children and then extract the record from that location in the tuple. The parent data (a1) can be obtained and set to the first position in the tuple. In a number of embodiments, block 509 (FIG. 5) can continue traversing the forward edges until the join steps are all exhausted. In some embodiments, block 510 (FIG. 5) can find the group in which the tuple belongs and evaluates the tuple in that group, and the group can be added to the dirty groups. Proceeding to block 504 (FIG. 5), in various embodiments, the group in the dirty groups can be published. Receiving records b2, b3, b4, d1, and d2, which are each new child records that relate to an existing parent record, can proceed similarly through block 302 (FIG. 5).

As a further example, upon receiving an update to the a1 record with changed join keys, block 501 (FIG. 5) can determine that the data received is an update to an existing record, and can proceed to block 502 (FIG. 5) of determining that the join keys have changed by the update to the record. In several embodiments, the process of block 302 (FIGS. 3, 5) can proceed to block 505 (FIG. 5) of removing the row from the record store of the data table and from all transition stores, which can be accomplished by obtaining the first step that is required to join data table A to its children and extracting the record from that location in the tuple. In a number of embodiments, the tuple can be evaluated in the group with a subtractive operation, and that removed group can be added to the dirty groups. In some embodiments, block 505 (FIG. 5) can continue traversing the forward edges until the steps are exhausted, and the record can be removed from the record store. In many embodiments, the process of block 302 (FIGS. 3, 5) can proceed to block 506 (FIG. 5) of determining that the last key was not removed, and then to block 508 (FIG. 5) of determining that the record is an update. At block 511 (FIG. 5), in a number of embodiments, the process of block 302 (FIGS. 3, 5) can add the record to the record store. In various embodiments, the process of block 302 (FIGS. 3, 5) can proceed to block 512 (FIG. 5) of determining that an upstream transition was added, which can then proceed to null removal in block 513 (FIG. 5). In several embodiments, the process of block 302 (FIGS. 3, 5) can then proceed to block 509 (FIG. 5) of executing the join steps, which can include finding the index of the data table (which is the position in the join), and setting that tuple location to the new data. In many embodiments, block 509 (FIG. 5) can get the first step that is required to join data table A to its children and extract that record from that location in the tuple. Because there is no data in that location, in several embodiments, the record can be set to a null record. In various embodiments, block 509 (FIG. 5) can continue traversing the forward edges until the join steps are all exhausted. In block 510 (FIG. 5), in a number of embodiments, a new group to which the tuple belongs can be created, the tuple can be evaluated in that group, and the group can be added to the dirty groups.

Proceeding to block 504 (FIG. 5), in many embodiments, the group in the dirty groups can be published.

Figure 8:
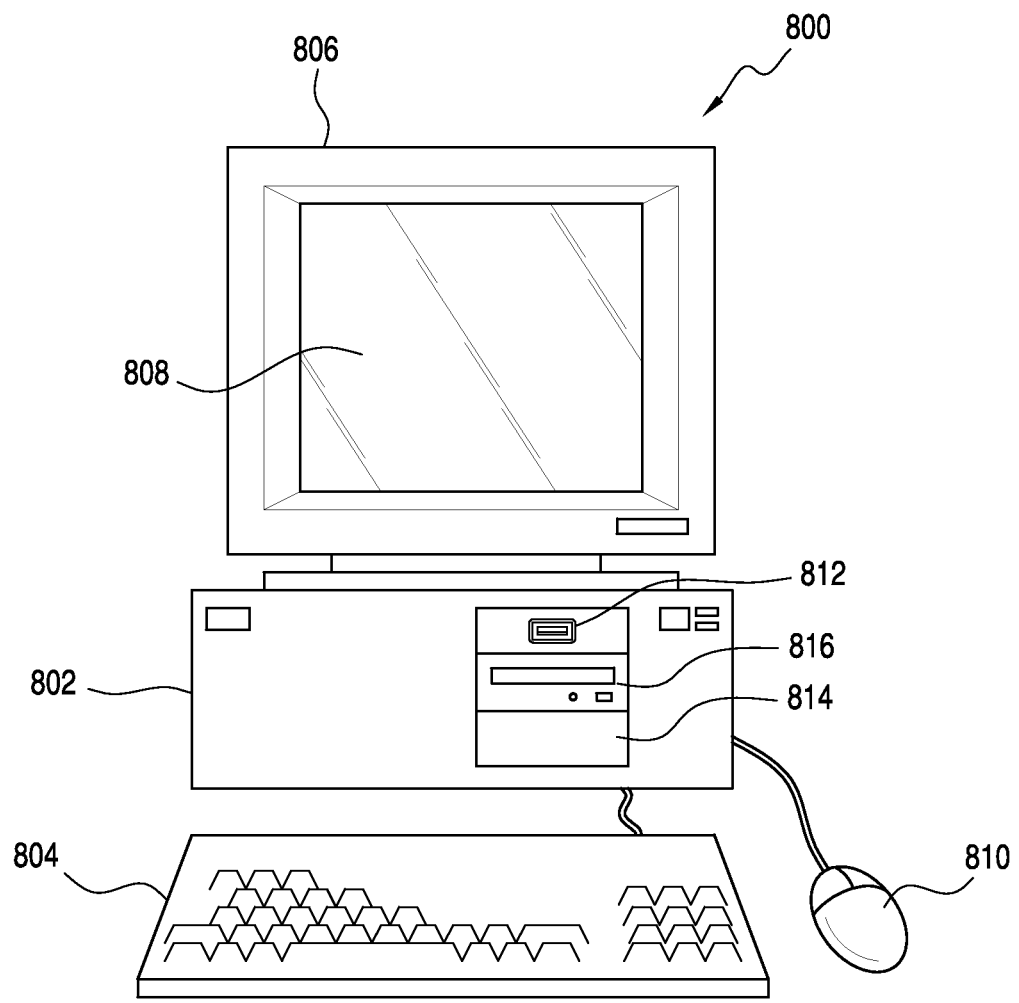
FIG. 8 illustrates a computer system that is suitable for implementing an embodiment of at least a portion of the computer system of FIG. 2.
Figure 9:
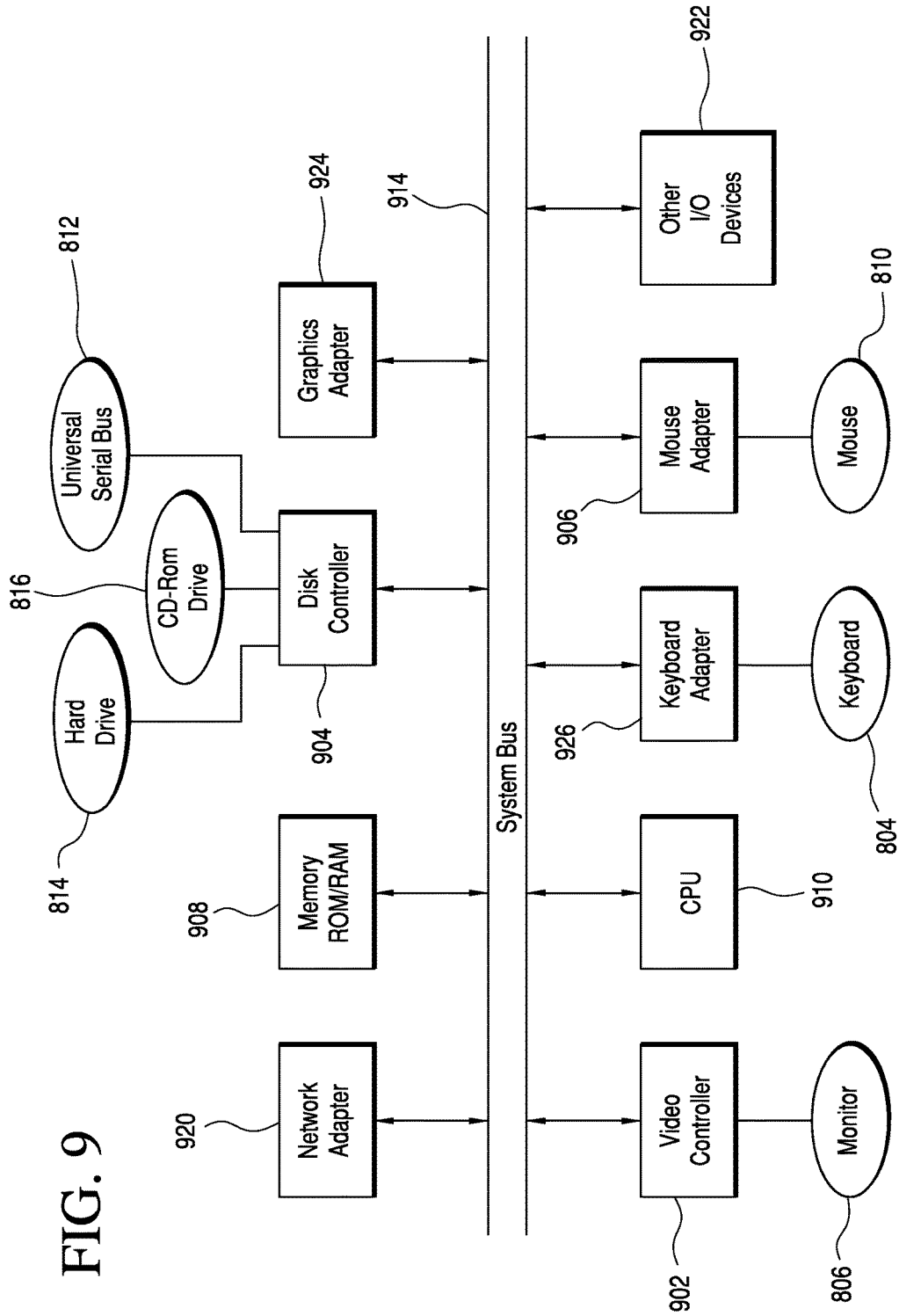
FIG. 9 illustrates a representative block diagram of an example of elements included in circuit boards inside a chassis of the computer of FIG. 8.

Turning ahead in the drawings, FIG. 8 illustrates a computer system 800, all of which or a portion of which can be suitable for implementing an embodiment of at least a portion of computer system 200 (FIG. 2). Computer system 800 includes a chassis 802 containing one or more circuit boards (not shown), a USB (universal serial bus) port 812, a Compact Disc Read-Only Memory (CD-ROM) and/or Digital Video Disc (DVD) drive 816, and a hard drive 814. A representative block diagram of the elements included on the circuit boards inside chassis 802 is shown in FIG. 9. A central processing unit (CPU) 910 in FIG. 9 is coupled to a system bus 914 in FIG. 9. In various embodiments, the architecture of CPU 910 can be compliant with any of a variety of commercially distributed architecture families.

Continuing with FIG. 9, system bus 914 also is coupled to memory 908 that includes both read only memory (ROM) and random access memory (RAM). Non-volatile portions of memory storage unit 908 or the ROM can be encoded with a boot code sequence suitable for restoring computer system 800 (FIG. 8) to a functional state after a system reset. In addition, memory 908 can include microcode such as a Basic Input-Output System (BIOS). In some examples, the one or more memory storage units of the various embodiments disclosed herein can comprise memory storage unit 908, a USB-equipped electronic device, such as, an external memory storage unit (not shown) coupled to universal serial bus (USB) port 812 (FIGS. 8-9), hard drive 814 (FIGS. 8-9), and/or CD-ROM or DVD drive 816 (FIGS. 8-9). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 910.

In the depicted embodiment of FIG. 9, various I/O devices such as a disk controller 904, a graphics adapter 924, a video controller 902, a keyboard adapter 926, a mouse adapter 906, a network adapter 920, and other I/O devices 922 can be coupled to system bus 914. Keyboard adapter 926 and mouse adapter 906 are coupled to a keyboard 604 (FIGS. 8 and 9) and a mouse 810 (FIGS. 8 and 9), respectively, of computer system 800 (FIG. 8). While graphics adapter 924 and video controller 902 are indicated as distinct units in FIG. 9, video controller 902 can be integrated into graphics adapter 924, or vice versa in other embodiments. Video controller 902 is suitable for refreshing a monitor 806 (FIGS. 8 and 9) to display images on a screen 808 (FIG. 8) of computer system 800 (FIG. 8). Disk controller 904 can control hard drive 814 (FIGS. 8 and 9), USB port 812 (FIGS. 8 and 9), and CD-ROM or DVD drive 816 (FIGS. 8 and 9). In other embodiments, distinct units can be used to control each of these devices separately.

In some embodiments, network adapter 920 can comprise and/or be implemented as a WNIC (wireless network interface controller) card (not shown) plugged or coupled to an expansion port (not shown) in computer system 800 (FIG. 8). In other embodiments, the WNIC card can be a wireless network card built into computer system 800 (FIG. 8). A wireless network adapter can be built into computer system 800 (FIG. 8) by having wireless communication capabilities integrated into the motherboard chipset (not shown), or implemented via one or more dedicated wireless communication chips (not shown), connected through a PCI (peripheral component interconnector) or a PCI express bus of computer system 800 (FIG. 8) or USB port 812 (FIG. 8). In other embodiments, network adapter 920 can comprise and/or be implemented as a wired network interface controller card (not shown).

Although many other components of computer system 800 (FIG. 8) are not shown, such components and their interconnection are well known to those of ordinary skill in the art. Accordingly, further details concerning the construction and composition of computer system 800 (FIG. 8) and the circuit boards inside chassis 802 (FIG. 8) need not be discussed herein.

When computer system 800 in FIG. 8 is running, program instructions stored on a USB drive in USB port 812, on a CD-ROM or DVD in CD-ROM and/or DVD drive 816, on hard drive 814, or in memory 908 (FIG. 9) are executed by CPU 910 (FIG. 9). A portion of the program instructions, stored on these devices, can be suitable for carrying out all or at least part of the techniques described herein.

Although computer system 800 is illustrated as a desktop computer in FIG. 8, there can be examples where computer system 800 may take a different form factor while still having functional elements similar to those described for computer system 800. In some embodiments, computer system 800 may comprise a single computer, a single server, or a cluster or collection of computers or servers, or a cloud of computers or servers. Typically, a cluster or collection of servers can be used when the demand on computer system 800 exceeds the reasonable capability of a single server or computer. In certain embodiments, computer system 800 may comprise a portable computer, such as a laptop computer. In certain other embodiments, computer system 800 may comprise a mobile device, such as a smartphone. In certain additional embodiments, computer system 800 may comprise an embedded system.

Although the disclosure has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments. For example, one or more of the procedures, processes, or activities of FIGS. 3-5 may include different procedures, processes, and/or activities and be performed by many different modules, in many different orders, and/or one or more of the procedures, processes, or activities of FIGS. 3-5 may include one or more of the procedures, processes, or activities of another different one of FIGS. 3-5.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method for performing windowless real-time joins, the method being implemented via execution of computer instructions configured to run at one or more processors and configured to be stored at one or more non-transitory computer-readable media, the method comprising:
   prior to receiving streaming data over a network:
      initializing data structures comprising a record store and a transition store, the initializing the data structures comprising:
         building a hash key mapping associated with data tables;
         building a list of the data tables associated with table joins, wherein the table joins comprise relationships between the data tables;
         creating the record store for each of the data tables; and
         creating the transition store for each relationship of the table joins; and
      pre-computing steps to be performed upon receiving the streaming data, the pre-computing the steps comprising:
         initializing one or more full join steps, wherein each of the one or more full join steps comprises location information of a first join key of a first data table and a second join key of a second data table, the data tables comprise the first and second data tables, and the steps comprise the one or more full join steps; and
         initializing one or more removal steps, wherein the one or more removal steps are one or more subsets of the one or more full join steps, and the steps comprise the one or more removal steps; and
   upon receiving the streaming data over the network, performing windowless join updates comprising:
      performing the steps that were pre-computed prior to receiving the streaming data, comprising:
         executing the one or more full join steps; and
         executing the one or more removal steps.

2. The method of claim 1, wherein:
   pre-computing the steps to be performed upon receiving the streaming data comprises:
      creating record comparators, wherein the record comparators are configured to compare column values of the data tables to determine if a join condition is satisfied.

3. The method of claim 1, wherein:
   performing the windowless join updates further comprises:
      conflating joined tuples based on at least a portion of data contained within the joined tuples.

4. The method of claim 1, wherein:
   performing the windowless join updates further comprises:
      displaying to a user joined data.

5. The method of claim 1, wherein:
   performing the windowless join updates further comprises:
      reconstructing a joined state, wherein the joined state is organized by each of the data tables reduce a number of valid joined tuples determined by each join type.

6. The method of claim 1, wherein:
   performing the windowless join updates further comprises:
      altering a dosteps routine predicate to select a join type.

7. The method of claim 1, wherein:
   pre-computing the steps to be performed upon receiving the streaming data comprises:
      creating record comparators, wherein the record comparators are configured to compare column values of the data tables to determine if a join condition is satisfied; and
   performing the windowless join updates further comprises:
      conflating joined tuples based on at least a portion of data contained within the joined tuples.

8. The method of claim 1, wherein:
   pre-computing the steps to be performed upon receiving the streaming data comprises:
      creating record comparators, wherein the record comparators are configured to compare column values of the data tables to determine if a join condition is satisfied; and
   performing the windowless join updates further comprises:
      conflating joined tuples based on at least a portion of data contained within the joined tuples; and
      displaying to a user joined data.

9. The method of claim 1, wherein:
   pre-computing the steps to be performed upon receiving the streaming data comprises:
      creating record comparators, wherein the record comparators are configured to compare column values of the data tables to determine if a join condition is satisfied; and
   performing the windowless join updates further comprises:
      conflating joined tuples based on at least a portion of data contained within the joined tuples; and
      reconstructing a joined state, wherein the joined state is organized by each of the data tables to reduce a number of the joined tuples that are valid as determined by each join type.

10. A system configured to perform windowless real-time joins, the system comprising:
    one or more processors; and
    one or more non-transitory computer-readable media storing computing instructions configured to run on the one or more processors and perform:
       prior to receiving streaming data over a network:
          initializing data structures comprising a record store and a transition store, the initializing the data structures comprising:

building a hash key mapping associated with data tables;
building a list of the data tables associated with table joins, wherein the table joins comprise relationships between the data tables;
creating the record store for each of the data tables; and
creating the transition store for each relationship of the table joins; and
pre-computing steps to be performed upon receiving the streaming data, the pre-computing the steps comprising:
initializing one or more full join steps, wherein each of the one or more full join steps comprises location information of a first join key of a first data table and a second join key of a second data table, the data tables comprise the first and second data tables, and the steps comprise the one or more full join steps; and
initializing one or more removal steps, wherein the one or more removal steps are one or more subsets of the one or more full join steps, and the steps comprise the one or more removal steps; and
upon receiving the streaming data over the network, performing windowless join updates, comprising:
performing the steps that were pre-computed prior to receiving the streaming data, comprising:
executing the one or more full join steps; and
executing the one or more removal steps.

11. The system of claim 10, wherein:
pre-computing the steps to be performed upon receiving the streaming data comprises:
creating record comparators, wherein the record comparators are configured to compare column values of data tables to determine if a join condition is satisfied.

12. The system of claim 10, wherein:
performing the windowless join updates further comprises:
conflating joined tuples based on at least a portion of data contained within the joined tuples.

13. The system of claim 10, wherein:
performing the windowless join updates further comprises:
displaying to a user joined data.

14. The system of claim 10, wherein:
performing the windowless join updates further comprises:
reconstructing a joined state, wherein the joined state is organized by each of the data tables to reduce a number of valid joined tuples determined by each join type.

15. The system of claim 10, wherein:
performing the windowless join updates further comprises:
altering a dosteps routine predicate to select a join type.

16. The system of claim 10, wherein:
pre-computing the steps to be performed upon receiving the streaming data comprises:
creating record comparators, wherein the record comparators are configured to compare column values of the data tables to determine if a join condition is satisfied; and
performing the windowless join updates further comprises:
conflating joined tuples based on at least a portion of data contained within the joined tuples; and
altering a dosteps routine predicate to select a join type.

17. The system of claim 10, wherein:
pre-computing the steps to be performed upon receiving the streaming data comprises:
creating record comparators, wherein the record comparators are configured to compare column values of the data tables to determine if a join condition is satisfied; and
performing the windowless join updates further comprises:
conflating joined tuples based on at least a portion of data contained within the joined tuples;
altering a dosteps routine predicate to select a join type; and
displaying to a user joined data.

18. The system of claim 10, wherein:
pre-computing the steps to be performed upon receiving the streaming data comprises:
creating record comparators, wherein the record comparators are configured to compare column values of the data tables to determine if a join condition is satisfied; and
performing the windowless join updates further comprises:
conflating joined tuples based on at least a portion of data contained within the joined tuples.

19. The system of claim 10, wherein:
pre-computing the steps to be performed upon receiving the streaming data comprises:
creating record comparators, wherein the record comparators are configured to compare column values of the data tables to determine if a join condition is satisfied; and
performing the windowless join updates further comprises:
conflating joined tuples based on at least a portion of data contained within the joined tuples; and
displaying to a user joined data.

20. The system of claim 10, wherein:
pre-computing the steps to be performed upon receiving the streaming data comprises:
creating record comparators, wherein the record comparators are configured to compare column values of the data tables to determine if a join condition is satisfied; and
performing the windowless join updates further comprises:
conflating joined tuples based on at least a portion of data contained within the joined tuples; and
reconstructing a joined state, wherein the joined state is organized by each of the data tables to reduce a number of the joined tuples that are valid as determined by each join type.

21. The system of claim 10, wherein:
pre-computing the steps to be performed upon receiving the streaming data comprises:
creating record comparators, wherein the record comparators are configured to compare column values of the data tables to determine if a join condition is satisfied; and
performing the windowless join updates further comprises:
conflating joined tuples based on at least a portion of data contained within the joined tuples; and
altering a dosteps routine predicate to select a join type.

22. The system of claim 10, wherein:
pre-computing the steps to be performed upon receiving the streaming data comprises:
  creating record comparators, wherein the record comparators are configured to compare column values of the data tables to determine if a join condition is satisfied; and
performing the windowless join updates further comprises:
  conflating joined tuples based on at least a portion of data contained within the joined tuples;
  altering a dosteps routine predicate to select a join type; and
  displaying to a user joined data.

* * * * *